Patented Feb. 12, 1929.

1,702,181

UNITED STATES PATENT OFFICE.

ROBERT H. VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION OF ILLINOIS.

PYROXYLIN COMPOSITION.

No Drawing.  Application filed January 26, 1928. Serial No. 249,779.

This invention relates to a composition of matter comprising pyroxylin and a hexyl alcohol, and particularly to a composition comprising pyroxylin and methyl-isobutyl carbinol.

Methyl-isobutyl carbinol may be represented by the formula, $$(CH_3)_2.CH.CH_2.CHOH.CH_3.$$

It has a high proportion of carbon to oxygen, a secondary alcohol group, a branched-chain structure, and an optically active carbon atom. The alcohol boils 131.8° C. at a pressure equal to 760 mm. of mercury; the rate of evaporation at ordinary temperatures is very slow, in fact only 25% of the rate for 99% butyl acetate. The odor is entirely different from that of normal-butyl or normal or isoamyl alcohol. Whereas the use of either of these latter alcohols in quantity in a lacquer imparts a "choking" odor, the use of the secondary hexyl alcohol gives an odor, suggestive of a terpene, that may be described as having a "clearing" rather than a "choking" effect.

Methyl-isobutyl carbinol is of especial value in brushing lacquers as a means of improving the odor, lengthening the time of brushing before the film sets, or decreasing the activity of the lacquer film upon a previously applied pyroxylin film or undercoat. In spray lacquers methyl-isobutyl carbinol is valuable for the same reasons and also because of its unusual power to prevent blushing when used in association with a slowly evaporating ester.

A specific example of my invention follows. One part by weight of pyroxylin, containing about 0.3 parts of alcohol that was not removed in the commercial process of dehydration, is shaken, until solution appears to be complete, with 10 parts of a solvent mixture of the following composition: methyl-isobutyl carbinol, 15% by volume; acetate of methyl-isobutyl carbinol, 15%; butyl acetate, 10%; ethyl acetate, 5%; denatured alcohol, 5%; toluol, 50%.

Other solvent mixtures follow. Any of these mixtures may be added to any of the several types of pyroxylin—1/2-sec., 35-sec., or 140-sec. viscosity, dope or lacquer pyroxylin, or regular or alcohol-soluble. The proportion of pyroxylin to solvent mixture may be varied to give a fluid or viscous solution.

All percentages in the table are by volume. The solvent used in dehydrating the pyroxylin and not removed in the dehydrating process has been neglected in calculating the percentages.

*Composition of solvent in pyroxylin solutions.*

| Number | 1 | 2 | 3 | 4 | 5 | 6 | 7 |
|---|---|---|---|---|---|---|---|
| Methyl-isobutyl carbinol | 30% | 35% | 10% | 5% | 3% | 20% | 5% |
| Acetate of methyl-isobutyl carbinol | 45 | 35 | 50 | 10 | 3 | 35 |  |
| Butyl alcohol |  |  |  |  | 5 | 5 |  |
| Butyl acetate |  |  | 15 | 15 | 35 |  | 50 |
| Denatured ethyl alcohol |  |  | 5 |  | 5 |  |  |
| Ethyl acetate |  |  | 5 | 5 | 5 |  |  |
| Toluol |  |  |  | 40 | 60 |  |  |
| Xylol |  | 15 | 15 |  |  | 45 |  |
| Petroleum fraction boiling at 140–150° C | 25 | 15 |  |  |  |  |  |
| Petroleum naphtha, 58° Bé |  |  |  |  | 44 |  | 45 |

A specific example illustrating the use of plasticizer, resin, and methyl-isobutyl carbinol is the following brushing lacquer.

Pyroxylin (dehydrated with xylol), 1 part by weight.
Dibutyl phthalate, 0.4 part by weight.
Ester gum (Paramet brand), 1 part by weight.
Methyl-isobutyl carbinol, 4 parts by weight.
Acetate of methyl-isobutyl carbinol, 4 parts by weight.
Xylol, distilling at 138–142° C., 6 parts by weight.

In another formula, the 6 parts of xylol are substituted by 3 parts of a distilled petroleum fraction which boils at 140–150° C.

The invention is not limited to the specific illustrations that have been given. Proportions may be varied widely. Substitutions of other materials may be made in a manner that will be obvious to one skilled in the art. Thus amyl alcohol and amyl acetate may be substituted for the corresponding butyl compounds. The secondary propyl or secondary butyl alcohols or acetates may also be incorporated. Butyl propionate may be substituted for the acetate of methyl-isobutyl carbinol. Plasticizers may be used, as, for example, dibutyl phthalate, di-normal-amyl phthalate, or tricresyl phosphate. There may be used resins, as, for example, ester gum, dewaxed damar, or shellac. To give colored lacquers, pigments may be used, as, for example, zinc oxide or Prussian blue.

I claim:

1. A composition of matter comprising pyroxylin and methyl-isobutyl carbinol.

2. A composition of matter comprising pyroxylin, a volatile ester, and methyl-isobutyl carbinol.

3. A composition of matter comprising pyroxylin, methyl-isobutyl carbinol, and a volatile ester of boiling point higher than that of methyl-isobutyl carbinol.

4. A composition of matter comprising pyroxylin, methyl-isobutyl carbinol, and the acetate of methyl-isobutyl carbinol.

5. A composition of matter comprising pyroxylin, dibutyl phthalate, a volatile ester, and methyl isobutyl carbinol.

6. A composition of matter comprising pyroxylin, dibutyl phthalate, methyl-isobutyl carbinol, and a volatile ester of boiling point higher than that of methyl-isobutyl carbinol.

7. A composition of matter comprising pyroxylin, dibutyl phthalate, methyl-isobutyl carbinol, and the acetate of methyl-isobutyl carbinol.

ROBERT H. VAN SCHAACK, Jr.